(12) United States Patent
Dainobu

(10) Patent No.: US 10,795,206 B2
(45) Date of Patent: Oct. 6, 2020

(54) LIQUID CRYSTAL DISPLAY DEVICE

(71) Applicant: Sharp Kabushiki Kaisha, Sakai, Osaka (JP)

(72) Inventor: Hideki Dainobu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/482,722

(22) PCT Filed: Jan. 30, 2018

(86) PCT No.: PCT/JP2018/002992
§ 371 (c)(1),
(2) Date: Aug. 1, 2019

(87) PCT Pub. No.: WO2018/143204
PCT Pub. Date: Aug. 9, 2018

(65) Prior Publication Data
US 2020/0225538 A1 Jul. 16, 2020

(30) Foreign Application Priority Data

Feb. 6, 2017 (JP) .................................. 2017-019873

(51) Int. Cl.
*G02F 1/13357* (2006.01)
(52) U.S. Cl.
CPC .... *G02F 1/133608* (2013.01); *G02F 2201/56* (2013.01)
(58) Field of Classification Search
None
See application file for complete search history.

(56) References Cited

U.S. PATENT DOCUMENTS

| | | | | |
|---|---|---|---|---|
| 2012/0218492 | A1* | 8/2012 | Koganezawa | .... G02F 1/133308 349/58 |
| 2013/0088662 | A1* | 4/2013 | Watanabe | ............... G09F 9/301 349/58 |
| 2013/0322112 | A1* | 12/2013 | Zhang | .................. G02B 6/0088 362/606 |
| 2017/0090113 | A1* | 3/2017 | Yuki | .................... G02B 6/0088 |
| 2020/0132924 | A1* | 4/2020 | Dainobu | .............. G02B 6/0088 |

FOREIGN PATENT DOCUMENTS

| | | |
|---|---|---|
| JP | 2012-177740 A | 9/2012 |
| WO | 2015/178302 A1 | 11/2015 |

OTHER PUBLICATIONS

Official Communication issued in International Patent Application No. PCT/JP2018/002992, dated Apr. 10, 2018.

* cited by examiner

*Primary Examiner* — Ryan Crockett
(74) *Attorney, Agent, or Firm* — Keating & Bennett, LLP

(57) ABSTRACT

The present invention provides a liquid crystal display device which allows a backlight case to be easily produced. A liquid crystal display device (1) includes: a liquid crystal panel (3) whose planar shape has a contour a part of which includes a curved part (31); and a backlight case (11) configured to hold therein a backlight for emitting light to the liquid crystal panel (3), the backlight case (11) including a resin part (21) and a sheet metal part (22) which are integrally formed, and the backlight case (11) having a part which corresponds to the curved part (31) and is formed by the resin part (21).

2 Claims, 5 Drawing Sheets

LIQUID CRYSTAL DISPLAY DEVICE

TECHNICAL FIELD

The present invention relates to a liquid crystal display device, particularly to an irregularly-shaped liquid crystal display device.

BACKGROUND ART

There have recently been developed irregularly-shaped liquid crystal display devices each including a liquid crystal panel whose contour is non-rectangular. Patent Literature 1 discloses a liquid crystal display device including a liquid crystal panel which has a planar shape whose contour has a corner which is not right-angled.

CITATION LIST

Patent Literature

[Patent Literature 1]
Japanese Patent Application Publication Tokukai No. 2012-177740 (Publication Date: Sep. 13, 2012)

SUMMARY OF INVENTION

Technical Problem

A backlight case which is included in a liquid crystal display device and configured to hold therein a backlight is conventionally produced by bending sheet metal. Such a production method would be applicable to the case of a rectangular liquid crystal panel without any particular problem. Note, however, that it is difficult to form, by bending sheet metal, a side wall of a backlight case of such an irregularly-shaped liquid crystal display device as described earlier, in particular, a liquid crystal display device (e.g., a so-called free-form display (FFD)) including a liquid crystal panel which has a planar shape whose contour includes a curved part. A side wall of a backlight case of such an irregularly-shaped liquid crystal display device can be formed by, for example, metal cutting or die casting instead of bending sheet metal. Note, however, that metal cutting leads to high cost and is also unsuitable for mass production of liquid crystal display devices. Note also that die casting makes it impossible to carry out precise size control with respect to a backlight case.

The present invention has been made in view of the problems, and an object of the present invention is to provide an irregularly-shaped liquid crystal display device which (i) includes a liquid crystal panel having a planar shape whose contour is non-rectangular and (ii) is highly mass-producible.

Solution to Problem

In order to attain the object, a liquid crystal display device in accordance with an aspect of the present invention includes: a liquid crystal panel whose planar shape has a contour at least a part of which includes a curved part; and a backlight case configured to hold therein a backlight for emitting light to the liquid crystal panel, the backlight case including a resin part and a sheet metal part which are integrally formed, and the backlight case having a part which corresponds to the curved part and is formed by the resin part.

Advantageous Effects of Invention

According to an aspect of the present invention, a backlight case has a part which corresponds to a curved part of a liquid crystal panel and is formed by a resin part. With the configuration, even in a case where a liquid crystal panel has a planar shape whose contour partially includes a curved part, it is possible to easily produce a backlight case which conforms with a contour of the liquid crystal panel. Thus, in a case where a backlight case can be easily produced as described above, irregularly-shaped liquid crystal display devices can be mass-produced accordingly.

DESCRIPTION OF EMBODIMENTS

Embodiment 1

Figure 1:
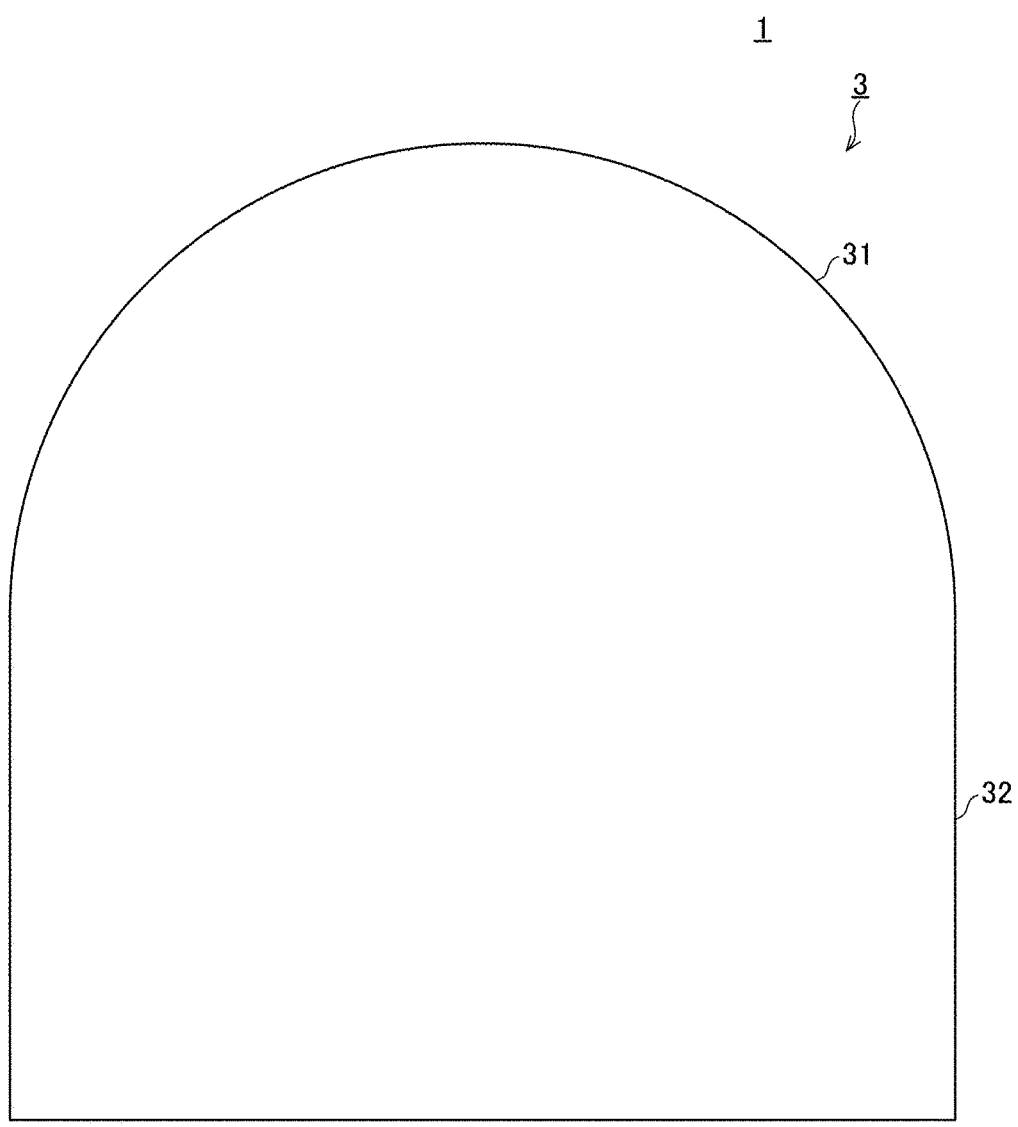
FIG. 1 is a plan view schematically illustrating a configuration of a liquid crystal display device in accordance with Embodiment 1 of the present invention.
Figure 2:
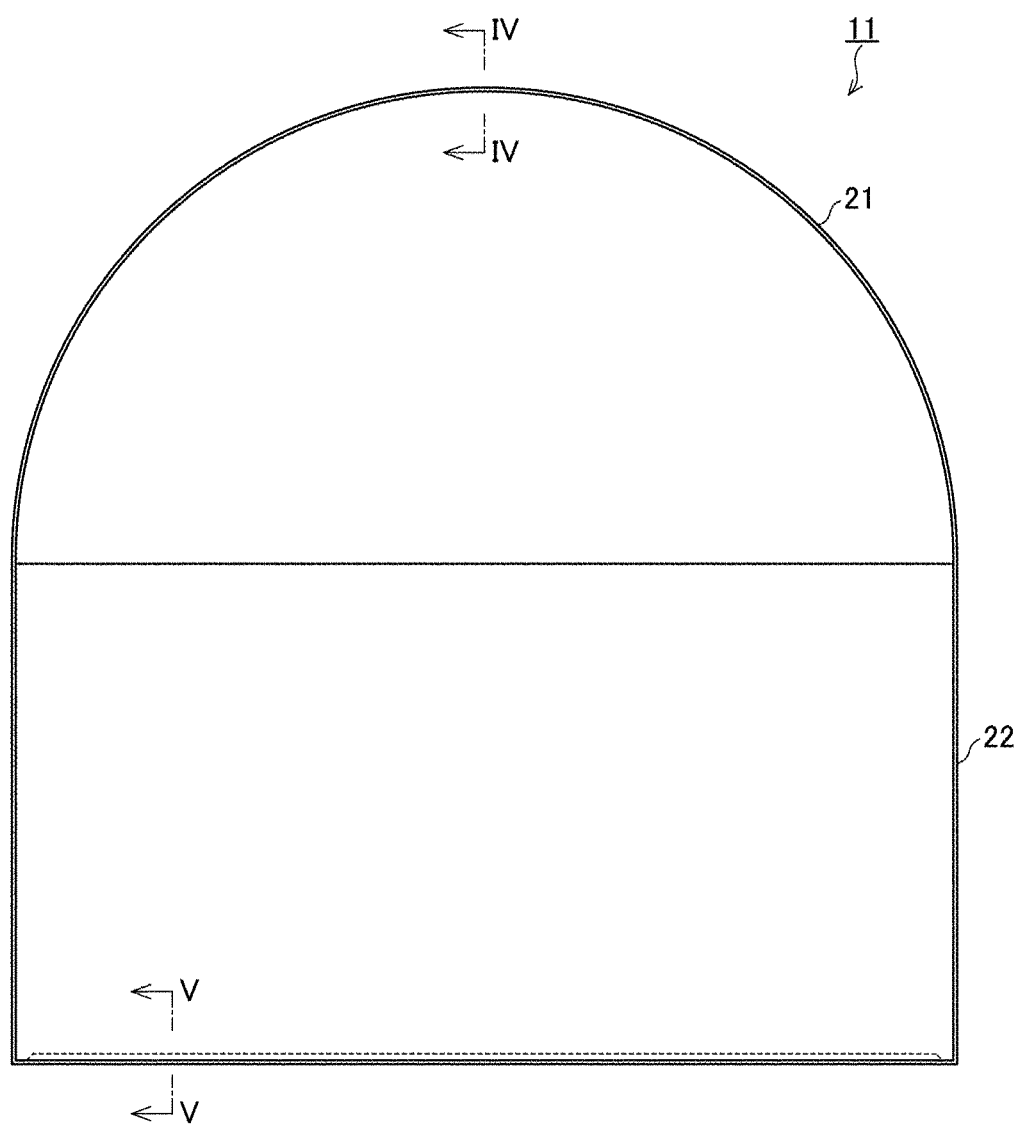
FIG. 2 is a plan view schematically illustrating a configuration of a backlight case provided in the liquid crystal display device of FIG. 1.
Figure 3:
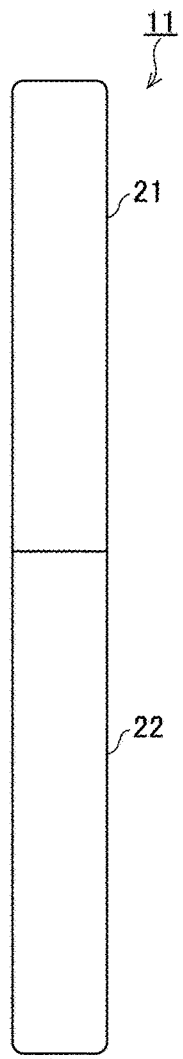
FIG. 3 is a side view of the backlight case of FIG. 2.
Figure 4:
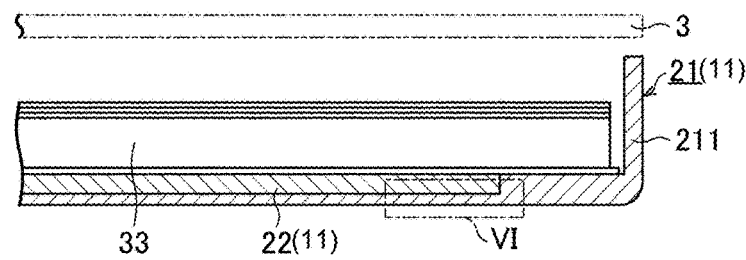
FIG. 4 is a cross-sectional view taken from line IV-IV of FIG. 2.
Figure 5:
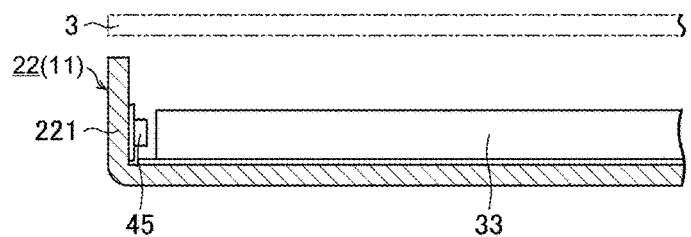
FIG. 5 is a cross-sectional view taken from line V-V of FIG. 2.
Figure 6:
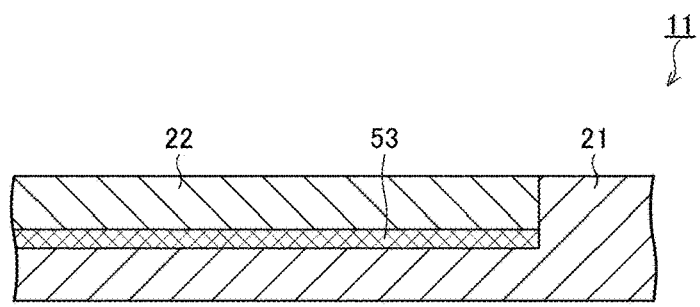
FIG. 6 is an enlarged view of a part VI enclosed by a dash-dot line in FIG. 4.

The following description will discuss an embodiment of the present invention with reference to FIGS. 1 through 6. FIG. 1 is a plan view schematically illustrating a configuration of a liquid crystal display device in accordance with Embodiment 1. FIG. 2 is a plan view schematically illustrating a configuration of a backlight case provided in the liquid crystal display device of FIG. 1. FIG. 3 is a side view of the backlight case of FIG. 2. FIG. 4 is a cross-sectional view taken from line IV-IV of FIG. 2. FIG. 5 is a cross-sectional view taken from line V-V of FIG. 2. FIG. 6 is an enlarged view of a part VI enclosed by a dash-dot line in FIG.

As described below with reference to FIGS. 1 through 6, a liquid crystal display device 1 is an irregularly-shaped liquid crystal display device whose liquid crystal panel has a non-rectangular shape. The liquid crystal display device 1 includes a liquid crystal panel 3 and a backlight case 11 which is provided so as to face a back surface of the liquid crystal panel 3 and configured to hold therein a backlight for emitting light to the liquid crystal panel 3. For convenience, FIGS. 4 and 5 each illustrate the backlight case 11 which is separated from the liquid crystal panel 3. Note, however, that the liquid crystal panel 3 is assumed to be actually fixed, by use of, for example, an adhesive tape (not illustrated), to an upper surface side end surface of the backlight case 11.

The liquid crystal panel 3 includes a curved part 31 which is obtained by forming, in a curved shape, part of a contour of a planar shape of the liquid crystal panel 3. The liquid crystal panel 3 further includes a linear part 32 which is obtained by forming, in a linear shape, a part of the contour of the planar shape which part is different from the curved part 31. Note that the "planar shape of the liquid crystal panel 3" herein refers to a shape of the liquid crystal panel 3 in plan view from a side on which a display region is provided.

The backlight case 11 has a planar shape whose contour corresponds to the contour of the planar shape of the liquid crystal panel 3. Note that a resin part 21 and a sheet metal part 22 which are integrally formed will be specifically described later.

A first part of the backlight case 11, which first part corresponds to the curved part 31 of the liquid crystal panel 3, is formed by the resin part 21. A second part of the backlight case 11, which second part corresponds to the linear part 32 of the liquid crystal panel 3, is formed by the sheet metal part 22. Furthermore, the backlight case 11 has, at its peripheral edge, a side wall 211 and a side wall 221 each formed by rising of the backlight case 11 toward the liquid crystal panel 3. The side wall 211 and the side wall 221 are constituted by the resin part 21 and the sheet metal part 22, respectively. The backlight case 11 is thus configured in a form of a housing whose side closer to the liquid crystal panel 3 is opened.

The resin part 21 can be made of a resin such as polycarbonate (PC). The sheet metal part 22 can be made of, for example, sheet metal containing aluminum (Al) or stainless steel (SUS). The sheet metal of which the sheet metal part 22 is made can have a thickness which is not limited to any particular thickness but is set as appropriate.

According to Embodiment 1, the backlight case 11 holds therein a backlight which includes (i) a light guide plate 33, (ii) a light emitting diode (LED) 45 which serves as a light source, and (iii) a flexible printed circuit (FPC) on which a driver (not illustrated) for driving the LED 45 is mounted.

According to Embodiment 1, the LED 45 is attached to the side wall 221, constituted by the sheet metal part 22, of the backlight case 11, so as to face an end surface of the light guide plate 33. With the configuration, the backlight is configured to serve as a sidelight type backlight. According to the configuration, light emitted from the LED 45 enters the light guide plate 33 and then exits to the liquid crystal panel 3.

According to Embodiment 1, since the LED 45 is provided in the sheet metal part 22, heat generated from the LED 45 is efficiently released by the sheet metal part 22.

The following description will specifically discuss, with reference to FIG. 6, the resin part 21 and the sheet metal part 22 which are included in the backlight case 11 and integrally formed. FIG. 6 is an enlarged view of a part VI enclosed by a dash-dot line in FIG. 4.

As illustrated in FIG. 6, the resin part 21 and the sheet metal part 22 of the backlight case 11 partially overlap each other. In a part in which the resin part 21 and the sheet metal part 22 overlap each other, the resin part 21 and the sheet metal part 22 are bonded together by an adhesive member 53.

Note that the adhesive member 53 is preferably exemplified by, but not particularly limited to, a double-sided tape and an adhesive.

An area of bonding, by the adhesive member 53, between the resin part 21 and the sheet metal part 22 can be set as appropriate in accordance with, for example, a size of the liquid crystal display device 1 and a type of adhesive to be used. For example, the area of bonding between the resin part 21 and the sheet metal part 22 accounts for ¼ to ½ of an entire area of the planar shape of the liquid crystal panel 3 in plan view.

According to the liquid crystal display device 1 of Embodiment 1, as described earlier, the backlight case 11 has a part which corresponds to the curved part 31 of the liquid crystal panel 3 and is formed by the resin part 21. Thus, the side wall 211, corresponding to the curved part 31 of the liquid crystal panel 3, of the backlight case 11 can be easily formed by producing the resin part 21 by resin molding. Furthermore, the side wall 221, corresponding to the linear part 32 of the liquid crystal panel 3, of the backlight case 11 can be formed by subjecting the sheet metal part 22 to, for example, a process for bending an end of sheet metal into an L shape. This makes it easier to produce the backlight case 11, so that the liquid crystal display device 1, which is an irregularly-shaped liquid crystal display device, can be mass-produced.

The liquid crystal display device 1 of Embodiment 1 allows the sheet metal part 22 of the backlight case 11 to release heat generated from the LED 45. This causes no fear that the heat may affect a liquid crystal display. Furthermore, according to Embodiment 1, it is possible to avoid any problem(s) (e.g., generation of a strange sound and/or breakage caused by vibration) which may occur in a case where the entire backlight case is produced by resin molding and consequently lacks rigidity. It follows that the liquid crystal display device 1 of Embodiment 1 can be suitably used also under unfavorable conditions such as a case where the liquid crystal display device 1 is provided in a vehicle.

According to Embodiment 1, the resin part 21 and the sheet metal part 22 are integrally formed by being bonded together by a specific method. Note, however, that the resin part 21 and the sheet metal part 22 of the backlight case 11 of an aspect of the present invention can be integrally formed by another method that allows the resin part 21 and the sheet metal part 22 to be integrally formed.

According to Embodiment 1, the liquid crystal panel 3 has a single curved part 31 at a specific position therein. Note, however, that a liquid crystal panel of an aspect of the present invention can have any number of curved parts provided at any respective positions, provided that the liquid crystal panel has a planar shape which has a contour at least a part of which includes a curved part.

Furthermore, according to Embodiment 1, the curved part 31 of the liquid crystal panel 3 has a specific curvature. Note, however, that a curved part of the liquid crystal panel in accordance with an aspect of the present invention does not necessarily need to have such a shape provided that the liquid crystal panel is configured to include at least a curved part. Thus, the curved part can have a curvature different from the above specific curvature.

Moreover, the backlight of the liquid crystal display device in accordance with an aspect of the present invention is not limited to the aforementioned sidelight type backlight. The backlight can be, for example, a backlight of any other type, such as a direct backlight in which a light source such as an LED is provided directly below a liquid crystal panel.

Further, the liquid crystal display device in accordance with an aspect of the present invention is configured to include the light source which is provided in the sheet metal part. Note, however, the liquid crystal display device in accordance with an aspect of the present invention can alternatively have a configuration different from the above configuration provided that the backlight is configured to be held at least in the light source case.

Furthermore, according to an aspect of the liquid crystal display device in accordance with an aspect of the present invention, the backlight case does not necessarily need to be configured as described earlier. The backlight case can hold therein an optical member other than the backlight provided that the backlight case is configured to hold therein at least the backlight.

Embodiment 2

Figure 7:
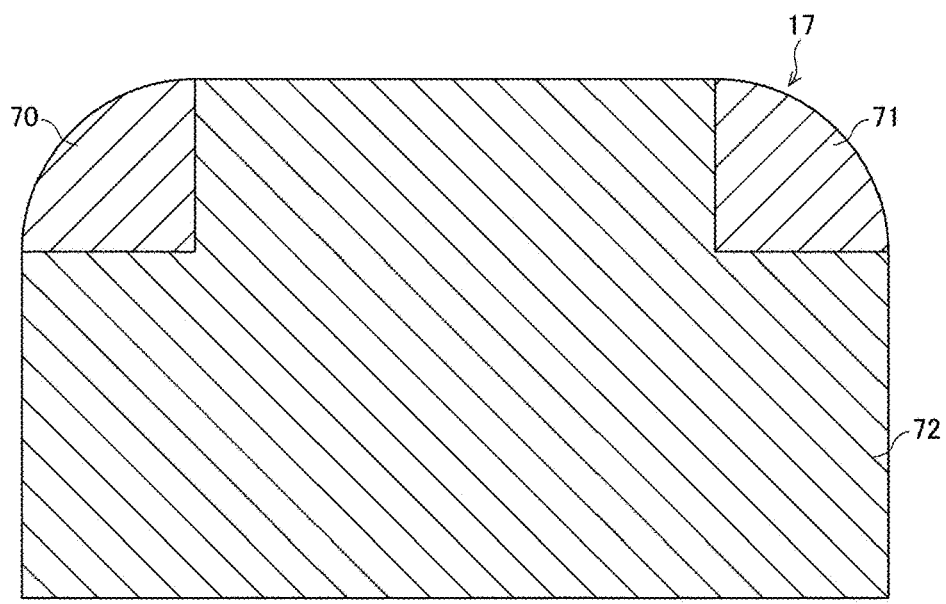
FIG. 7 is a plan view schematically illustrating a configuration of a backlight case in accordance with Embodiment 2.

The following description will discuss another embodiment of the present invention with reference to FIG. 7. Embodiment 2 mainly describes points of difference from Embodiment 1. It is needless to say that Embodiment 2 can be altered as in the case of Embodiment 1.

Embodiment 2 describes how a backlight case is configured in a case where a liquid crystal panel of a liquid crystal display device (not illustrated) has a planar shape whose contour includes two different curved parts, which are a first curved part and a second curved part. FIG. 7 is a plan view schematically illustrating a configuration of a backlight case in accordance with Embodiment 2.

As illustrated in FIG. 7, a backlight case 17 includes a first resin part 70, a second resin part 71, and a sheet metal part 72 which are integrally formed. The first resin part 70 and the second resin part 71 correspond to a first curved part and a second curved part, respectively, of the liquid crystal panel (not illustrated). Further, the sheet metal part 72 corresponds to a linear part of the liquid crystal panel (not illustrated). The first and second resin parts 70 and 71 are each bonded to the sheet metal part 72 by such an adhesive member (not illustrated) as described in Embodiment 1.

Note that according to Embodiment 2, the first resin part 70 and the second resin part 71 can be made of a single resin or respective different resins.

In a case where the liquid crystal panel thus includes a plurality of curved parts, the backlight case 17 can be provided with resin parts which correspond to the respective plurality of curved parts.

Embodiment 3

Figure 8:
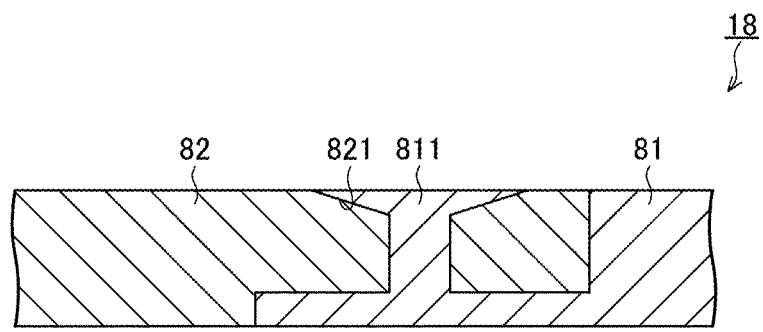
FIG. 8 is a view schematically illustrating a part, located at and near a joint between a resin part and a sheet metal part, of a backlight case in accordance with Embodiment 3.

The following description will discuss still another embodiment of the present invention with reference to FIG. 8. Embodiment 3 mainly describes points of difference from Embodiments 1 and 2. It is needless to say that Embodiment 3 can also be altered as in the case of Embodiments 1 and 2. FIG. 8 is a view schematically illustrating a part, located at and near a joint between a resin part and a sheet metal part, of a backlight case in accordance with Embodiment 3.

As illustrated in FIG. 8, a backlight case 18 in accordance with Embodiment 3 includes a resin part 81 and a sheet metal part 82 which are integrally formed. The resin part 81 has a protrusion 811. In contrast, the sheet metal part 82 has a recess 821. The protrusion 811 and the recess 821 are configured to fit together. The protrusion 811 and the recess 821 which fit together joins the resin part 81 and the sheet metal part 82 together, so that the backlight case 18 is formed.

Note that the resin part 81 and the sheet metal part 82 do not necessarily need to be joined together by the method which has been taken as an example in Embodiment 3. The resin part 81 and the sheet metal part 82 can alternatively be joined together by, for example, swaging (not illustrated). Furthermore, the resin part 81 and the sheet metal part 82 can be integrally formed by outsert molding.

[Recap]

A liquid crystal display device 1 in accordance with a first aspect of the present invention includes: a liquid crystal panel 3 whose planar shape has a contour at least a part of which includes a curved part 31; and a backlight case 11 configured to hold therein a backlight for emitting light to the liquid crystal panel 3, the backlight case 11 including a resin part 21 and a sheet metal part 22 which are integrally formed, and the backlight case having a part which corresponds to the curved part and is formed by the resin part.

With the configuration, a side wall of the backlight case 11 can be easily formed by resin molding so as to correspond to the curved part 31. Thus, according to an aspect of the present invention, since the backlight case 11 can be easily produced, the liquid crystal display device 1 can be mass-produced accordingly.

A liquid crystal display device in accordance with a second aspect of the present invention can be configured such that, in the first aspect, the resin part 21 and the sheet metal part 22 are bonded together.

The configuration makes it possible to easily produce the backlight case 11 by bonding together (i) the resin part 21 which has a side wall 211 which has been produced by, for example, resin molding and (ii) the sheet metal part 22 which has a side wall 221 which has been formed by carrying out a process for bending sheet metal.

A liquid crystal display device in accordance with a third aspect of the present invention can be configured such that, in the second aspect, an area of bonding between the resin part 21 and the sheet metal part 22 accounts for ¼ to ½ of an entire area of the planar shape of the liquid crystal panel 3 in plain view.

The configuration allows the resin part 21 and the sheet metal part 22 to be bonded together without fail.

A liquid crystal display device in accordance with a fourth aspect of the present invention can be configured such that, in the first aspect, the resin part 21 and the sheet metal part 22 are joined together.

With the configuration, the produced backlight case 11 can be separated into the resin part 21 and the sheet metal part 22 after the backlight case 11 has been produced.

A liquid crystal display device in accordance with a fifth aspect of the present invention can be configured such that, in any one of the first through fourth aspects of the present invention, the backlight includes an LED 45 which is provided in the sheet metal part 22 and serves as a light source.

The configuration allows the sheet metal part 22 to efficiently release heat generated from the LED 45.

The present invention is not limited to the foregoing embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Liquid crystal display device
3 Liquid crystal panel
11, 17, 18 Backlight case
21, 81 Resin part
70 First resin part
71 Second resin part
22, 72, 82 Sheet metal part
31 Curved part

32 Linear part
45 LED (light source)

The invention claimed is:

1. A liquid crystal display device comprising:
a liquid crystal panel whose planar shape has a contour at least a part of which includes a curved part; and
a backlight case configured to hold therein a backlight for emitting light to the liquid crystal panel,
the backlight case including a resin part and a sheet metal part which are integrally formed, and
the backlight case having a part which corresponds to the curved part and is formed by the resin part, wherein
the resin part and the sheet metal part are bonded together, and
an area of bonding between the resin part and the sheet metal part accounts for ¼ to ½ of an entire area of the planar shape of the liquid crystal panel in a plan view.

2. The liquid crystal display device as set forth in claim 1, wherein the backlight includes a light source which is provided in the sheet metal part.

* * * * *